(12) United States Patent
Lee

(10) Patent No.: US 10,937,323 B2
(45) Date of Patent: Mar. 2, 2021

(54) SYSTEM AND METHOD FOR GUIDING PARKING LOCATION OF VEHICLE

(71) Applicant: GARIN SYSTEM Co., Ltd., Incheon (KR)

(72) Inventor: Yun Sub Lee, Incheon (KR)

(73) Assignee: GARIN SYSTEM CO., LTD., Incheon (KR)

( * ) Notice: Subject to any disclaimer, the term of this patent is extended or adjusted under 35 U.S.C. 154(b) by 0 days.

(21) Appl. No.: 16/550,222

(22) Filed: Aug. 24, 2019

(65) Prior Publication Data

US 2020/0394921 A1 Dec. 17, 2020

(30) Foreign Application Priority Data

Jun. 13, 2019 (KR) .......................... 10-2019-0069806

(51) Int. Cl.
| | |
|---|---|
| *H04L 9/32* | (2006.01) |
| *G08G 1/16* | (2006.01) |
| *H04N 5/247* | (2006.01) |
| *G01S 19/45* | (2010.01) |
| *G01C 21/36* | (2006.01) |
| *H04L 29/08* | (2006.01) |

(52) U.S. Cl.
CPC ......... *G08G 1/168* (2013.01); *G01C 21/3685* (2013.01); *G01S 19/45* (2013.01); *H04N 5/247* (2013.01); *H04L 67/12* (2013.01)

(58) Field of Classification Search
CPC .... G08G 1/168; G01C 21/3685; G01S 19/45; H04N 5/247
See application file for complete search history.

(56) References Cited

U.S. PATENT DOCUMENTS

| | | | |
|---|---|---|---|
| 2006/0111822 A1* | 5/2006 | Simon ................. | B60R 25/1003 701/468 |
| 2020/0172089 A1* | 6/2020 | Dyer ..................... | B60W 30/06 |

* cited by examiner

*Primary Examiner* — Jonathan R Messmore
(74) *Attorney, Agent, or Firm* — Patent Office of Dr. Chung Park

(57) ABSTRACT

Systems and methods for parking a parking location of a vehicle. The system includes a photographing terminal acquiring a photographed image of the surroundings of a vehicle including photographing direction information, GPS coordinate information of a parking location of a vehicle, and unique identification information and transmitting the acquired information to a management server when a vehicle is turned off; a management server performing user authentication based on the unique identification information and retrieving road view images based on the GPS coordinate information to extract a road view image having a similarity equal to or greater than a preset reference value to the photographed image, and including location information of a vehicle based on the extracted road view image in map information to transmit the map information to a user terminal; and a user terminal receiving and displaying the map information including the location information of a vehicle.

9 Claims, 9 Drawing Sheets

P1

P2

SYSTEM AND METHOD FOR GUIDING PARKING LOCATION OF VEHICLE

CROSS-REFERENCE TO RELATED APPLICATIONS

This U.S. non-provisional patent application claims priority under 35 U.S.C. § 119 of Korean Patent Application No. 10-2019-0069806, filed on Jun. 13, 2019, the entire contents of which are hereby incorporated by reference.

BACKGROUND OF THE INVENTION

The present invention disclosed herein relates to a system and method for guiding a parking location of a vehicle, and more particularly, to a system and method for guiding a parking location of a vehicle, which can easily find the location of a vehicle by identifying the parking location using surrounding images and road view images of the parked vehicle and providing parking location information and the road view images through a user terminal.

In recent years, in order to identify the parking location of a vehicle, a smart phone uses a "map" based on the GPS location of a vehicle. However, when a vehicle is parked at a location where it is difficult to receive the GPS signal or vehicles can be vertically parked, it is difficult to find the accurate vehicle location only by the map.

Also, in recent years, when a vehicle is operated, it is possible to record front/rear side images by using a camera such as a black box attached to a vehicle. However, since these images are a large-capacity video continuously photographed, it is difficult for a user to check the videos with a smart phone at a remote place.

Furthermore, even if a video can be checked by a smart phone located at a remote location, there is a limitation in that it is inconvenient to find a parking location using a video, resulting in low practicality.

SUMMARY OF THE INVENTION

The present invention provides a system and method for guiding a parking location of a vehicle, which can easily find the location of a vehicle by identifying the parking location using surrounding images and road view images of the parked vehicle and providing parking location information and the road view images through a user terminal.

Embodiments of the present invention provide systems for guiding a parking location of a vehicle include: a photographing terminal acquiring a photographed image of the surroundings of a vehicle including photographing direction information, Global Positioning System coordinate information of a parking location of a vehicle, and unique identification information and transmitting the photographed image, the GPS coordinate information and the unique identification information to a management server when a vehicle is turned off; a management server performing user authentication based on the unique identification information when the photographed image, the GPS coordinate information and the unique identification information are received from the photographing terminal, and retrieving road view images based on the GPS coordinate information to extract a road view image having a similarity equal to or greater than a preset reference value to the photographed image when the user authentication is completed, and including location information of a vehicle based on the extracted road view image in map information to transmit the map information to a user terminal; and a user terminal receiving and displaying the map information including the location information of a vehicle transmitted from the management server.

In some embodiments, the photographing terminal may include: a camera module including a plurality of cameras for photographing the surroundings of a vehicle; a GPS module for outputting GPS coordinate information corresponding to a current location of a vehicle; a photographing terminal controller outputting an operation control signal to the camera module and the GPS module when a vehicle is turned off, adding photographing direction information to the photographed image outputted from the camera module, and controlling such that the photographed image, the GPS coordinate information and the pre-stored unique identification information are transmitted to the management server; and a data communication unit transmitting the photographed image, the GPS coordinate information and the unique identification information to the management server.

In other embodiments, the photographing terminal may further include a black box for photographing the surroundings of a vehicle, and the photographing terminal controller may receive a photographed image and GPS coordinate information outputted from the black box and transmit the photographed image and the GPS coordinate information to the management server.

In still other embodiments, the management server may include: a data communication unit receives the photographed image, the GPS coordinate information and the unique identification information from the photographing terminal and transmits the map information including the location information of a vehicle to the user terminal; a location analyzing unit performing the user authentication by comparing the received unique identification information with user information stored, retrieving road view images based on the received GPS coordinate information from a road view database to extract a road view image having a similarity equal to or greater than a preset reference value to the photographed image, and including location information of a vehicle based on the extracted road view image in map information retrieved from a map database to transmit the map information to the user terminal; a user database storing the unique identification information, the user information corresponding to the unique identification information, and information on the user terminal; a map database storing the GPS coordinate information and the map information; and a road view database storing the GPS coordinate information and the road view images.

In even other embodiments, the location analyzing unit may compare the received photographed image with the road view image using an image analysis program, calculate a similarity value according to the comparison result, and extract a road view image having a similarity value equal to or greater than a preset reference value for similarity determination.

In yet other embodiments, the location analyzing unit may extract parking direction information of a vehicle based on the location information corresponding to the photographed image on the extracted road view image and the photographing direction information included in the photographed image.

In further embodiments, the location analyzing unit may additionally transmit at least one of a forward road view image of the parked direction and a backward road view image of the parked direction to the user terminal based on the extracted parking direction information.

In still further embodiments, the location analyzing unit may retrieve whether the parking location of a vehicle is a no-parking and stopping area or a frequent accident area based on the GPS coordinate information of the extracted road view image and the parking and stopping mark information displayed on a road, and transmit the retrieval result to the user terminal.

In other embodiments of the present invention, methods for guiding a parking location of a vehicle include: acquiring, by a photographing terminal, a photographed image of the surroundings of a vehicle including photographing direction information, Global Positioning System coordinate information of a parking location of a vehicle, and unique identification information and transmitting the photographed image, the GPS coordinate information and the unique identification information to a management server when a vehicle is turned off; performing, by a management server, user authentication based on the unique identification information when the photographed image, the GPS coordinate information and the unique identification information are received from the photographing terminal, and retrieving road view images based on the GPS coordinate information to extract a road view image having a similarity equal to or greater than a preset reference value to the photographed image when the user authentication is completed, and including location information of a vehicle based on the extracted road view image in map information to transmit the map information to a user terminal; and receiving and displaying, by a user terminal, the map information including the location information of a vehicle transmitted from the management server.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Figure 1:
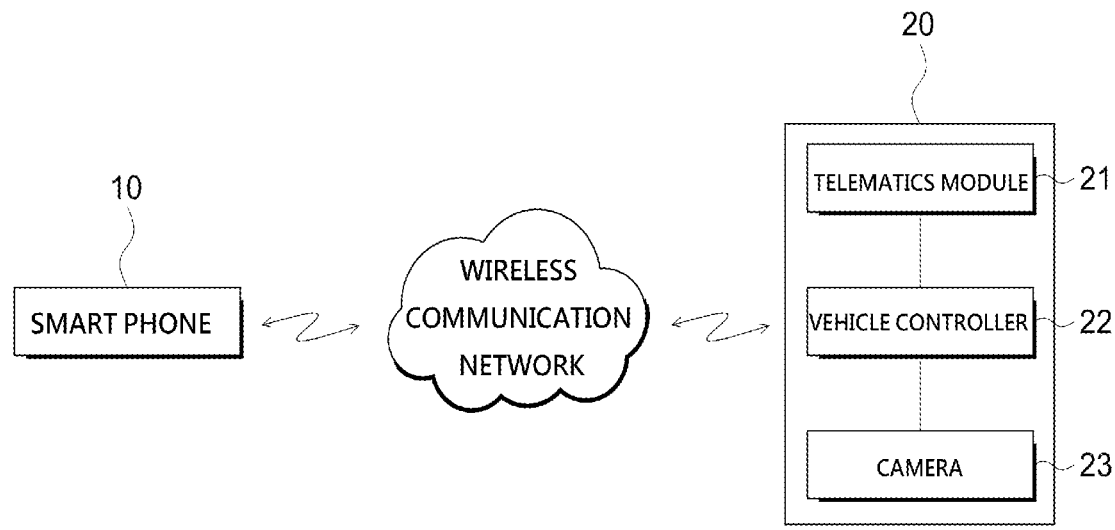
FIG. 1 is a view illustrating a parking location checking system for a vehicle according to a related art.
Figure 2:
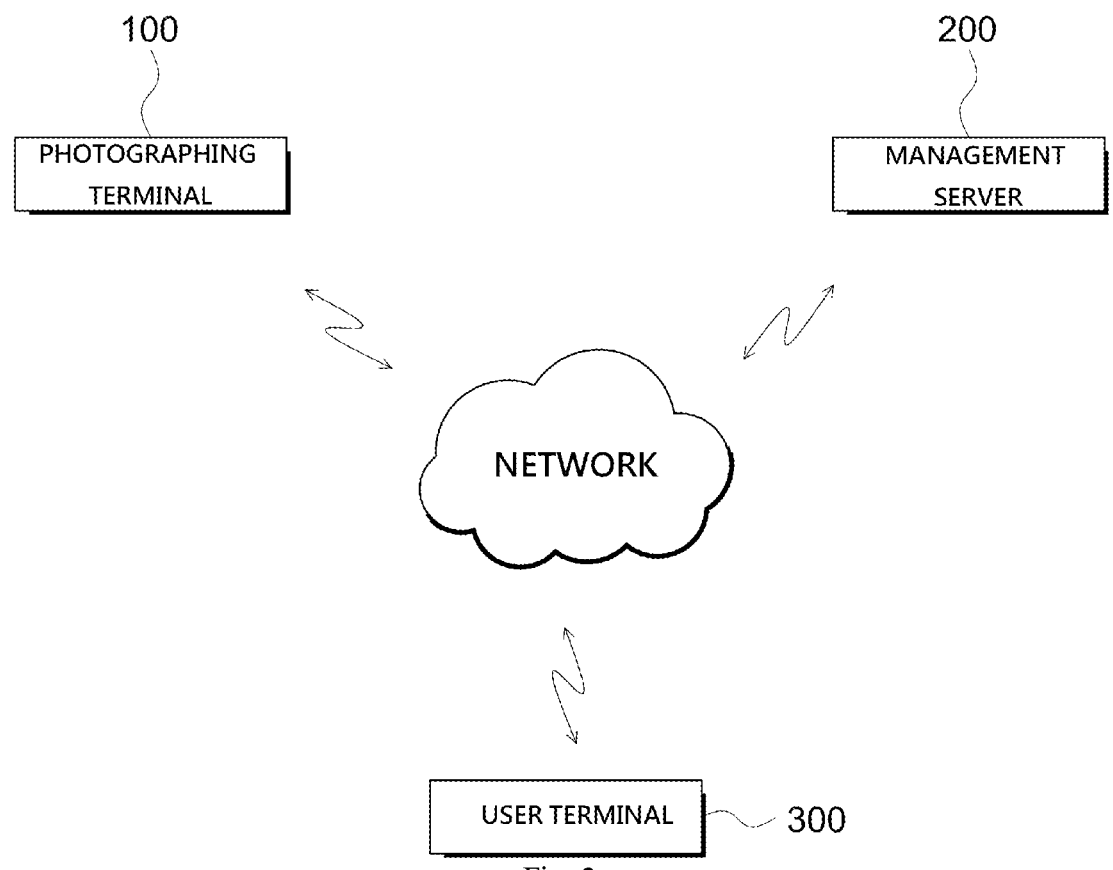
FIG. 2 is a view illustrating a parking location guiding system for a vehicle according to an embodiment of the present invention.
Figure 3:
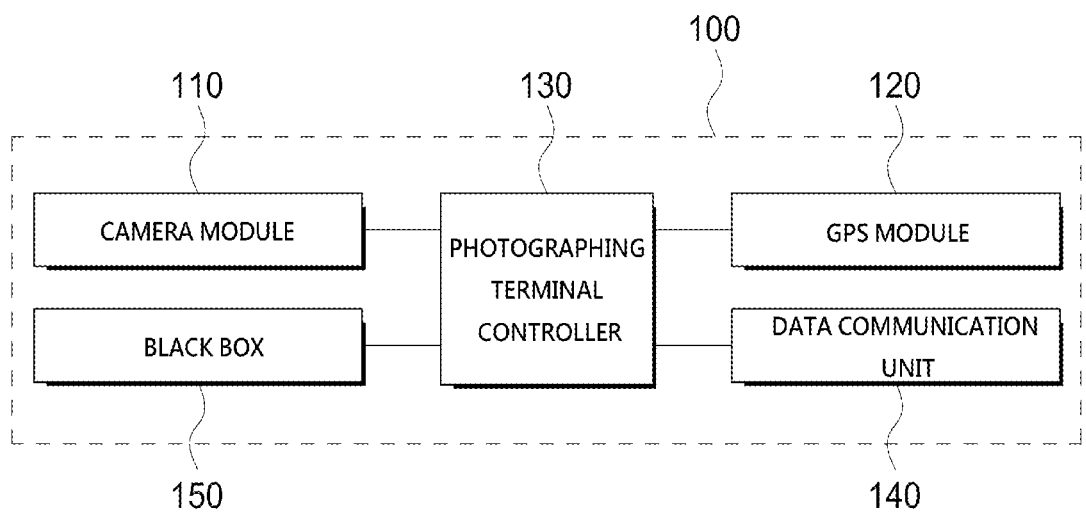
FIG. 3 is a view illustrating a configuration of a photographing terminal of the parking location guiding system for a vehicle according to the embodiment of FIG. 2.
Figure 4:
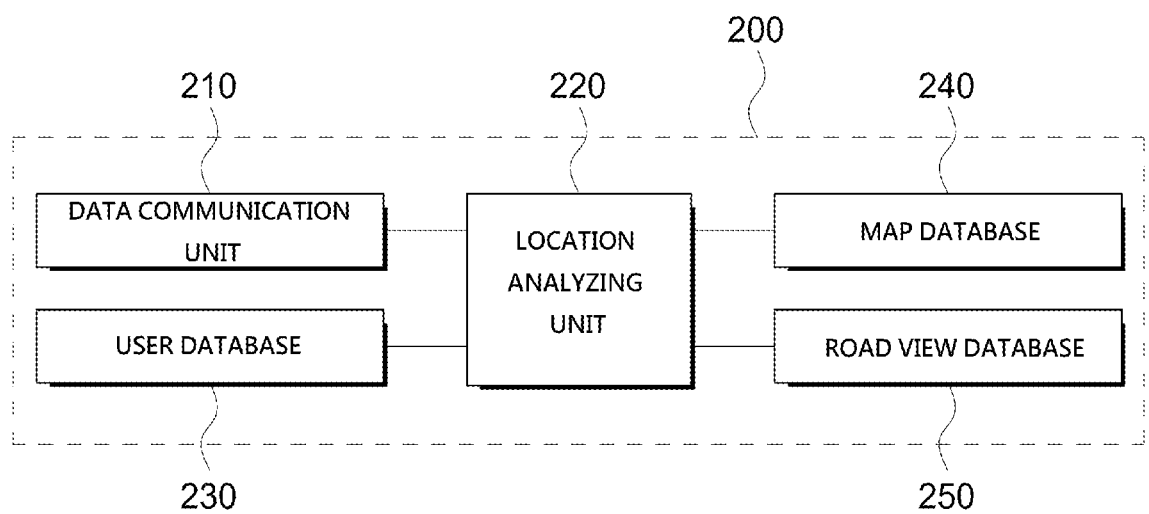
FIG. 4 is a view illustrating a management server configuration of the parking location guiding system for a vehicle according to the embodiment of FIG. 2.

FIG. 2 is a view illustrating a parking location guiding system for a vehicle according to an embodiment of the present invention, and FIG. 3 is a view illustrating a configuration of a photographing terminal of the parking location guiding system for a vehicle according to the embodiment of FIG. 2. FIG. 4 is a view illustrating a management server configuration of the parking location guiding system for a vehicle according to the embodiment of FIG. 2.

As shown in FIGS. 2 to 4, a parking location guiding system for a vehicle according to an embodiment of the present invention includes a photographing terminal 100, a management server 200, and a user terminal 300.

When a vehicle is turned off, the photographing terminal 100 acquires a photographed image of the surroundings of a vehicle including photographing direction information, GPS coordinate information of a parking location of a vehicle, and unique identification information and transmits the same to the management server 200. The photographing terminal 100 may include a camera module 110, a GPS module 120, a photographing terminal controller 130, and a data communication unit 140.

The camera module 110 may include a plurality of cameras installed in a vehicle to photograph the surroundings of a vehicle. The camera module 110 is turned on by an operation control signal outputted from the photographing terminal controller 130, and outputs the photographed images of the surroundings of a vehicle.

Also, the camera module 110 may include at least one of a genuine camera installed when a vehicle is delivered, a camera additionally installed by a user at an aftermarket after delivery of a vehicle, and a camera installed in a black box 150.

Also, the camera module 110 may be configured with two channels for capturing images of front and rear directions of a vehicle or four channels for capturing front/rear/left/right directions of a vehicle. Preferably, the camera module 110 may include a two-channel camera for capturing images of front and rear directions.

The GPS module 120 may receive GPS coordinate information from GPS satellites. When an operation control signal outputted from the photographing terminal controller 130 is inputted, the GPS module 120 receives the GPS coordinate information corresponding to the current location of a vehicle and outputs the GPS coordinate information to the photographing terminal controller 130.

The photographing terminal controller 130 monitors driving information of a vehicle, and outputs an operation control signal to the camera module 110 and the GPS module 120 when a vehicle is turned off.

Also, the photographing terminal controller 130 may set photographing direction information on a photographed image outputted from the camera module 110. For example, the photographing terminal controller 130 may set additional information "front direction" on an photographed image outputted from a camera capturing the front side of a vehicle, and additional information "rear direction" on an photographed image outputted from a camera capturing the rear side of a vehicle.

The additional information on the photographing direction may be used as information for determining the direction in which a vehicle is parked.

The photographing terminal controller 130 retrieves unique identification information pre-stored in the photographing terminal 100 and transmits the unique identification information to the management server 200 together with the photographed image and the GPS coordinate information.

The data communication unit 140 transmits the photographed image including the additional information about the photographing direction, the GPS coordinate information and the unique identification information of the photographing terminal 100 to the management server 200 through a wireless communication network.

The photographing terminal 100 may further include a black box 150 for photographing the surroundings of a vehicle.

The black box 150 is installed in a vehicle to photograph the front direction and the rear direction of a vehicle. The photographing terminal controller 130 receives photographed images outputted from the black box 150 and transmits the photographed images to the management server 200. Also, the photographing terminal controller 130 may transmit the photographed images to the management server 200 together with the additional information about the photographing direction.

Also, the photographing terminal controller 130 may receive GPS coordinate information from the black box 150 and may transmit the GPS coordinate information to the management server 200.

The management server 200 performs user authentication based on the unique identification information when receiving the photographed image, the GPS coordinate information, and the unique identification information transmitted from the photographing terminal 100.

That is, the management server 200 retrieves user information stored in a user database 230 using the unique identification information, and checks whether or not the user terminal is a user terminal of an authenticated user according to the search result.

A user information may include information of a user terminal 300 for providing the parking location information of a vehicle.

After the user authentication is completed, the management server 200 retrieves road view images based on the GPS coordinate information to extract a road view image having a similarity equal to or greater than a preset reference value to the photographed image, and includes location information of a vehicle based on the extracted road view image in map information to transmit the map information to the user terminal 300. The management server 200 includes a data communication unit 210, a location analyzing unit 220, a user database 230, a map database 240, and a road view database 250.

The data communication unit 210 receives the photographed images, the GPS coordinate information and the unique identification information transmitted from the photographing terminal 100, and provides the photographed images, the GPS coordinate information and the unique identification information to the location analyzing unit 220. The data communicating unit 210 transmits the map information including the location information of a vehicle, which is outputted from the location analyzing unit 220, to the user terminal 300.

The location analyzing unit 220 retrieves the user information from a user database 230 using the unique identification information received from the photographing terminal 100, and performs the user authentication through comparison with user information corresponding to the unique identification information.

Also, when the user authentication is completed, the location analyzing unit 220 retrieves at least one road view image corresponding to the GPS coordinate information in the road view database 250 based on the GPS coordinate information received from the photographing terminal 100.

Through the road view image, a forward road view image and a backward road view image may be acquired in accordance with the direction of a vehicle moving to generate the road view images.

Also, the location analyzing unit 220 compares the road view image retrieved through an image recognition program with the photographed image received from the photographing terminal 100 to calculates a similarity value, and compares the calculated similarity value with a preset reference value for determining the similarity to extract a road view image having a similarity value equal to or greater than the reference value.

Figure 5:
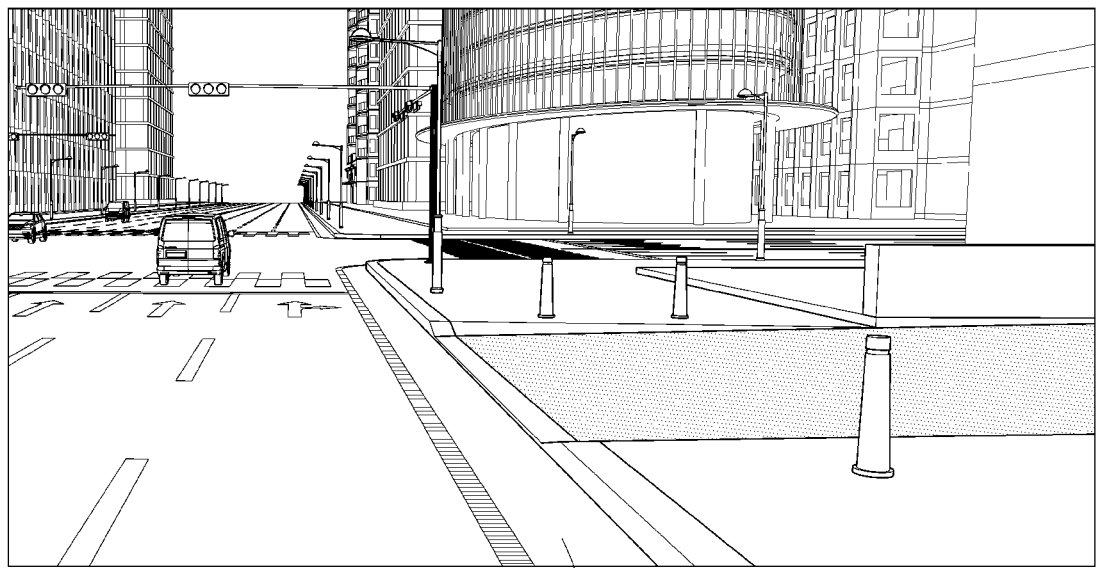
FIG. 5 is a view illustrating an image taken by the photographing terminal of the parking location guiding system for a vehicle according to the embodiment of FIG. 2.
Figure 6:
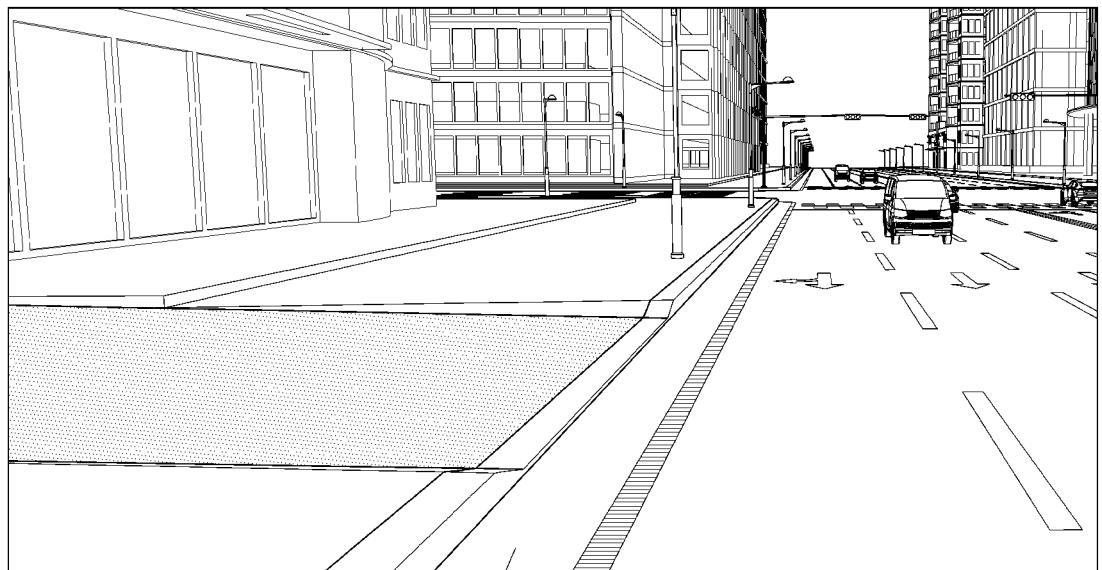
FIG. 6 is a view illustrating another image taken by the photographing terminal of the parking location guiding system of a vehicle according to the embodiment of FIG. 2.
Figure 7:
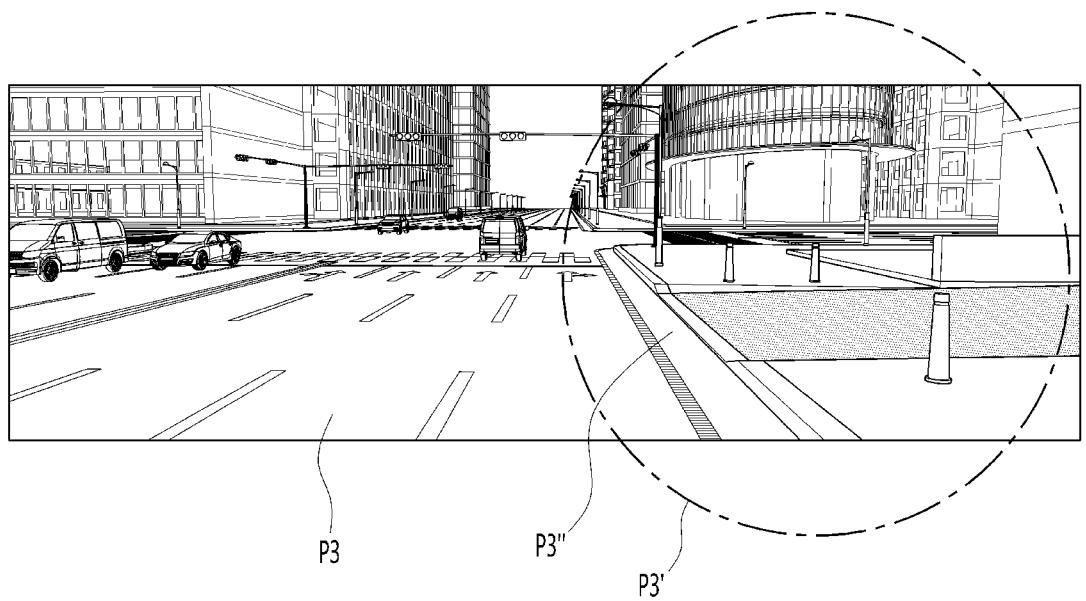
FIG. 7 is a view illustrating a road view image retrieved from the management server of the parking location guiding system of a vehicle according to the embodiment of FIG. 2.
Figure 8:
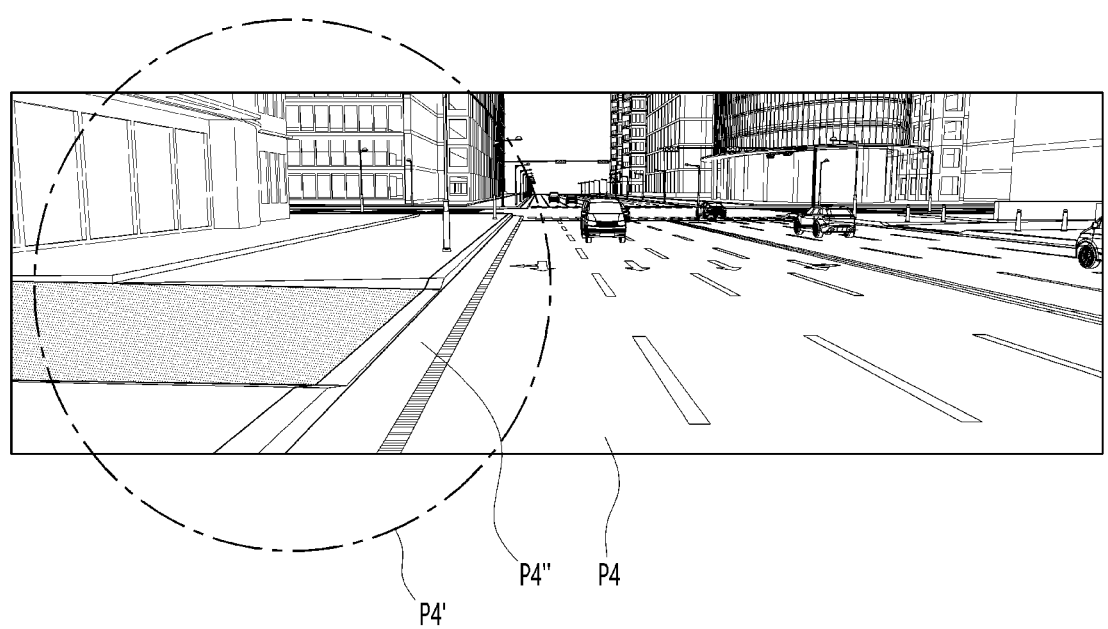
FIG. 8 is a view illustrating another road view image retrieved from the management server of the parking location guiding system of a vehicle according to the embodiment of FIG. 2.

That is, when a forward photographed image P1 as shown in FIG. 5 and a backward photographed image P2 as shown in FIG. 6 are received from the photographing terminal 100, the location analyzing unit 220 may extract road view images, e.g., a forward road view image P3 as shown in FIG. 7 and a backward road view image P4 as shown in FIG. 8 based on the GPS coordinate information.

In this case, in order to find a road view image close to the photographed image received from the photographing terminal 100, the location analyzing unit 220 distinguishes a road area on the road view image, removes vehicles from the distinguished road area, and recognizes and distinguishes a building area located around the road, thereby extracting a road view image having the closest similarity to the photographed image.

On the other hand, the road view image is mainly photographed at a central portion of the road, and differs from an image photographed by a vehicle parked on a road shoulder.

The location analyzing unit 220 may compare a left area (see FIG. 7) P3' of the forward road view image P3 with the forward photographed image P1 transmitted from the photographing terminal 100 using the photographing direction information transmitted from the photographing terminal 100, thereby quickly calculating the similarity value.

Also, in the case of the backward road view image, the location analyzing unit 220 may calculate the similarity value by comparing a left area P4' with the backward photographed image P2 transmitted from the photographing terminal 100.

Also, the location analyzing unit 220 may acquire information on the direction in which a vehicle is parked through the road view image and the photographing direction information of the photographed image received from the photographing terminal 100.

That is, the parking direction of a vehicle may be recognized by checking whether the forward photographed image taken by the photographing terminal 100 in the direction in which a vehicle is parked is close to the left area or the right area on the forward road view image or the backward road view image.

For example, when the photographed image taken by the photographing terminal 100 in the forward direction is located at the left area on the backward road view image, it may be determined that a parked vehicle is parked at the opposite side of the road.

In this case, the backward photographed image taken by the photographing terminal 100 will correspond to the right area on the forward road view image at the same location.

Also, when the forward photographed image taken by the photographing terminal 100 is located at the right side of the forward road view image, it may be determined that the parked vehicle is parked in the same direction.

In this case, the backward photographed image taken by the photographing terminal 100 will correspond to the left area on the backward road view image at the same location.

Also, the location analyzing unit 220 recognizes the parking marking lines P3 "and P4" shown on the road view image, and determines whether the parking location of a vehicle is a parkable and stoppable area or a no-parking and stopping area according to the recognition result.

In other words, when the line marked at the edge of the road is a double yellow line, the parking and stopping of a vehicle are prohibited under any circumstance. When the line is a single yellow line, the parking and stopping of a vehicle are prohibited, but may be allowed in accordance with the conditions if there is an auxiliary sign noticing separate permitted time and day. A single yellow dotted line denotes permission of stopping within 5 minutes. A single white solid line denotes permission of parking and stopping. Accordingly, it can be determined according to the kind of the road lines whether parking and stopping of a vehicle are allowed.

Also, the location analyzing unit 220 may access an external database (not shown) to receive big data information, and may check based on the received big data information whether the location on the GPS coordinate information of the extracted road view image is a parkable and stoppable area, a no-parking and stopping area, or a frequent accident area where many accidents occur during parking.

Also, the location analyzing unit 220 may perform an operation of transmitting information related to permission of the parking and stopping of a vehicle to the user terminal 300.

The location analyzing unit 220 may retrieve the location information of a vehicle based on the extracted road view image from the map database 240, and may display a vehicle location marker 410 on a retrieved map application 400 to transmit the vehicle location marker 410 to the user terminal 300.

Also, the location analyzing unit 220 may transmit at least one of the forward road view image and the backward road view image of the direction in which a vehicle is parked to the user terminal 300.

The user database 230 stores unique identification information of the photographing terminal 100, user information corresponding to the unique identification information, and information on the user terminal 300.

The map database 240 stores GPS coordinate information and map information linked with the GPS coordinate information.

The road view database 250 stores GPS coordinate information and road view images linked with the GPS coordinate information.

Figure 9:
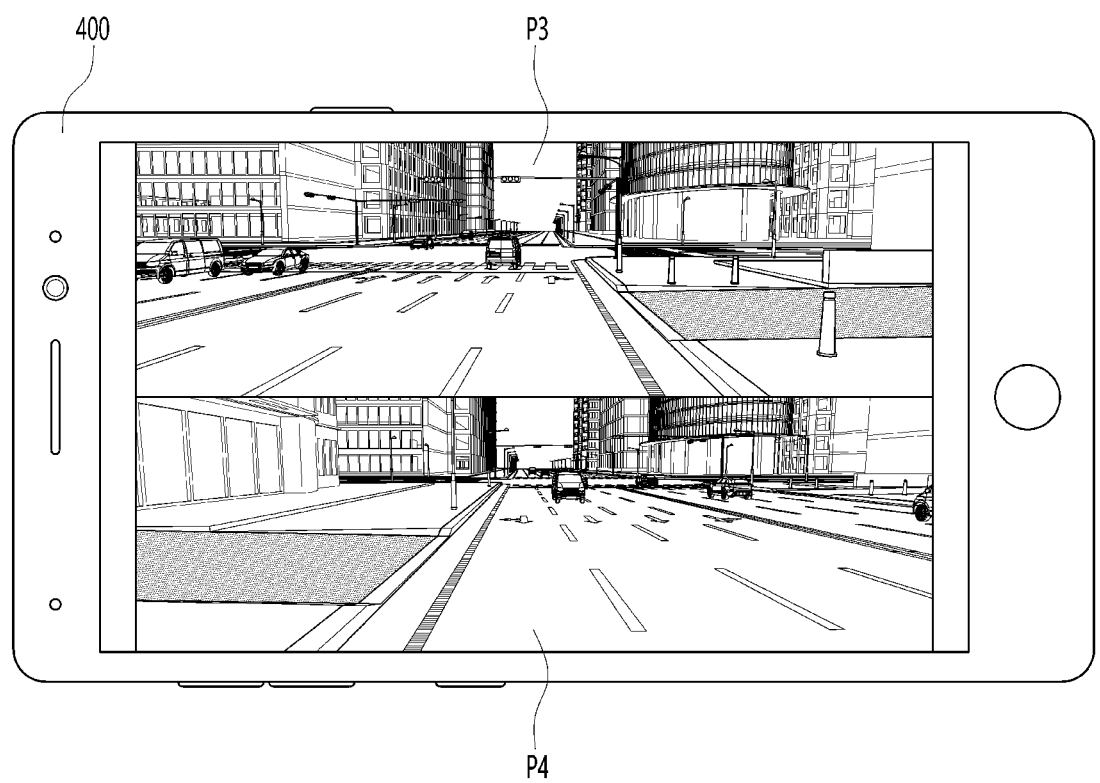
FIG. 9 is a view illustrating location information of a vehicle outputted from a user terminal of the parking location guiding system for a vehicle according to the embodiment of FIG. 2.

As shown in FIG. 9, the user terminal 300 may receive and display the map application 400 transmitted from the management server 200 and the map information including the vehicle location marker 410 indicating vehicle location information. The user terminal 300 may include a mobile terminal such as a smart phone or a tablet PC in which an application program can be installed.

Figure 10:
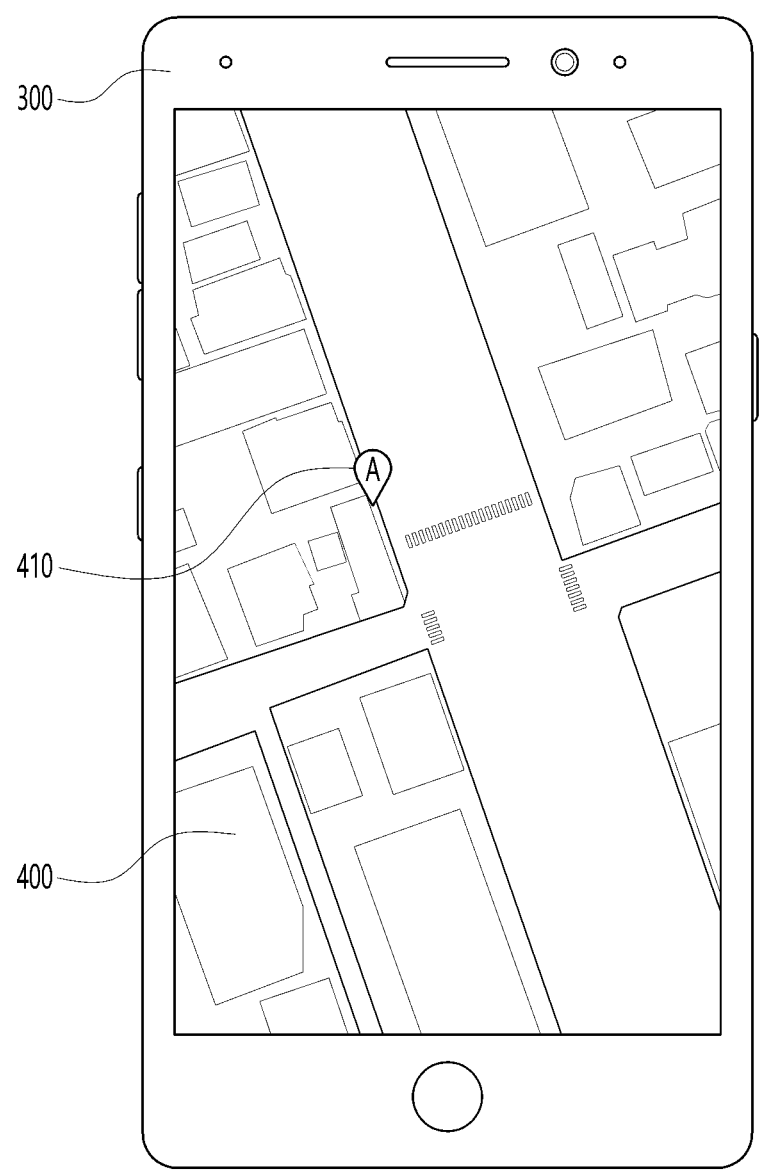
FIG. 10 is a view illustrating a road view image outputted from a user terminal of a parking location guiding system for a vehicle according to the embodiment of FIG. 2.
Figure 11:
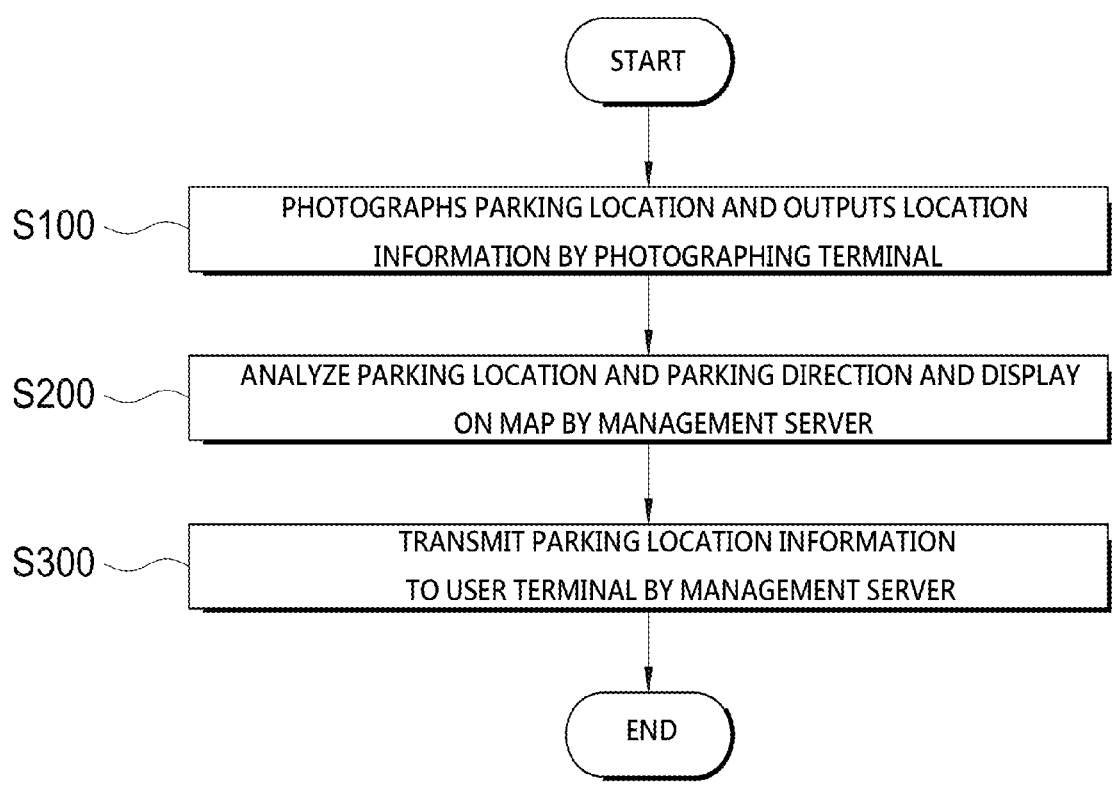
FIG. 11 is a flowchart illustrating a parking location guiding method for a vehicle according to an embodiment of the present invention.
Figure 12:
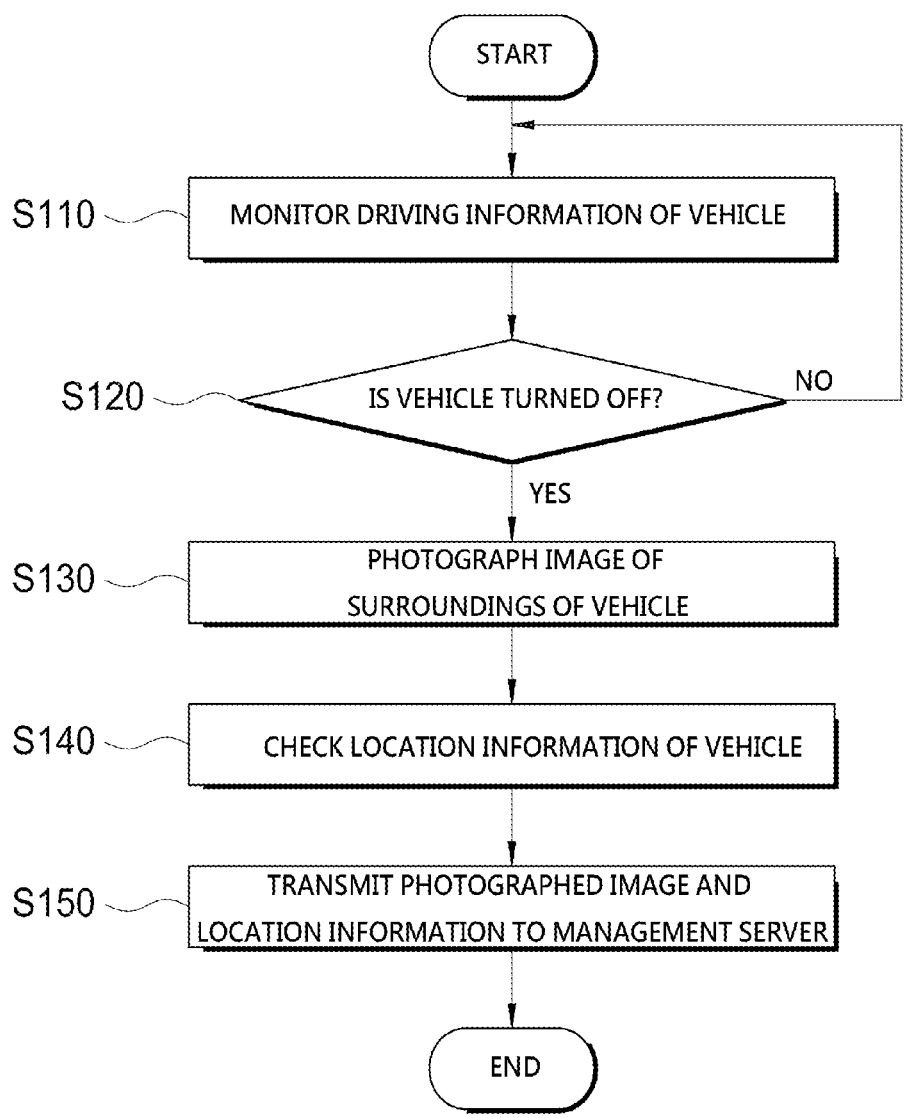
FIG. 12 is a flowchart illustrating a process of providing parking location information by a photographing terminal in the parking location guiding method for a vehicle according to the embodiment of FIG. 11.
Figure 13:
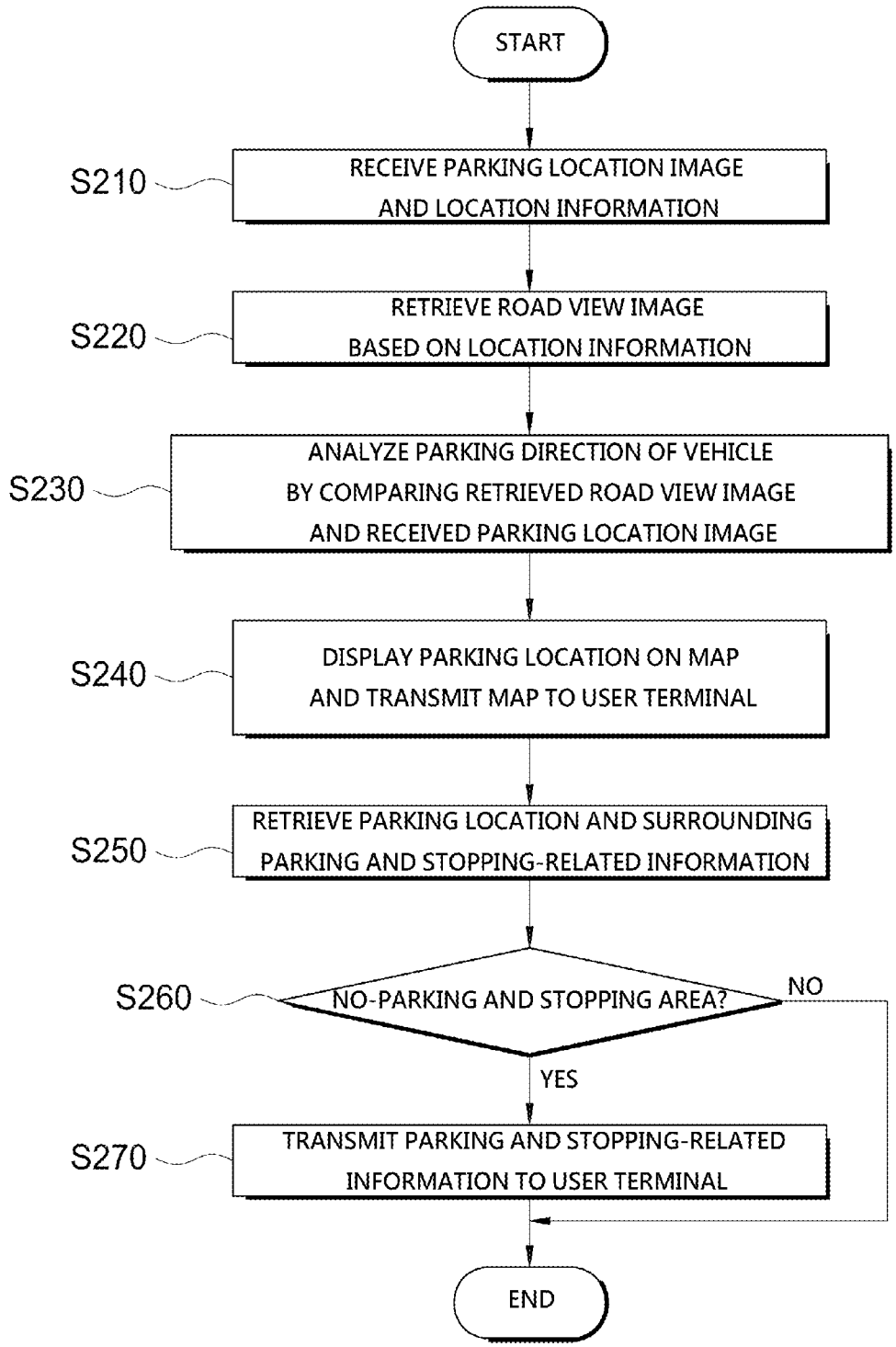
FIG. 13 is a flowchart illustrating a process of analyzing a parking location by a management server in the parking location guiding method of a vehicle according to the embodiment of FIG. 11.

As shown in FIG. 10, the user terminal 300 may receive and display the forward road view image P3 and the backward road view image P4 of the direction in which a vehicle is parked, which are transmitted by the management server 200, thereby allowing a user to return to the parking location while checking the road view image.

Hereinafter, a parking location guiding method for a vehicle according to an embodiment of the present invention will be described with reference to FIGS. 2 to 4 and FIGS. 11 to 13.

In the parking location guiding method for a vehicle according to an embodiment of the present invention, when a vehicle is turned off, the photographing terminal 100 acquires the photographed image of the surroundings of a vehicle including the photographing direction information, the GPS coordinate information of the parking location of a vehicle, and the unique identification information and transmits the same to the management server 200 (S100).

That is, in operation S100, the photographing terminal 100 monitors the driving information of a vehicle (S110), and determines whether or not a vehicle is turned off (S120).

When it is determined in operation S120 that a vehicle is turned off, the photographing terminal 100 photographs the surroundings of a parked vehicle using the camera module 110 (S130), and receives GPS coordinate information of the parking location of a vehicle using the GPS module 120 (S140).

After performing operations S130 and S140, the photographing terminal 100 adds photographing direction information to the photographed image taken by the camera module 110, and extracts the photographed image to which the photographing direction information is added, the GPS coordinate information and the unique identification information assigned to the photographing terminal 100 to transmit the same to the management server 200 (S150).

Also, in the parking location guiding method for a vehicle according to an embodiment of the present invention, the management server 200 performs user authentication based on the unique identification information when the photographed image, the GPS coordinate information and the unique identification information are received from the photographing terminal 100, and retrieves road view images based on the GPS coordinate information to extract a road view image having a similarity equal to or greater than a preset reference value to the photographed image when the user authentication is completed, and includes location information of a vehicle based on the extracted road view image in map information to transmit the map information to a user terminal 300 (S200).

That is, in operation S200, when the management server 200 receives the photographed image, the GPS coordinate information, and the unique identification information from the photographing terminal 100 (S210), the management server 200 retrieves a road view image based on the received GPS coordinate information from the road view database 250 (S220).

In this case, in operation S220, the management server 200 may additionally perform user authentication by comparing the unique identification information with the user information stored in the user database 230.

The management server 200 compares the road view image retrieved in operation S220 through an image recognition program with the photographed image received from the photographing terminal 100 to calculates a similarity value, and compares the calculated similarity value with a preset reference value for determining the similarity to extract a road view image having a similarity value equal to or greater than the reference value (S230).

In operation S230, the management server 200 may extract direction information of a parked vehicle based on the location information corresponding to the photographed image on the extracted road view image and the photographing direction information included in the photographed image.

That is, the parking direction of a vehicle may be recognized by checking whether the forward photographed image taken by the photographing terminal 100 in the direction in which a vehicle is parked is close to the left area or the right area on the forward road view image or the backward road view image.

For example, when the photographed image taken by the photographing terminal 100 in the forward direction is located at the left area on the backward road view image or when the backward photographed image taken by the photographing terminal 100 is located at the right area on the forward road view image at the same location, it may be determined that a parked vehicle is parked at the opposite side of the road.

Also, when the photographed image taken by the photographing terminal 100 in the forward direction is located at the right area on the forward road view image or when the backward photographed image taken by the photographing terminal 100 is located at the left area on the backward road view image at the same location, it may be determined that a parked vehicle is parked in the same direction as the forward road view image.

After performing operation S230, the management server 200 retrieves the location information of a vehicle based on the extracted road view image from the map database 240, displays a vehicle location marker 410 on the retrieved map information, and transmits the vehicle location marker 410 to the terminal 300 (S240).

After performing operation S240, the management server 200 retrieves whether or not the location where a vehicle is parked is a no parking and stopping area based on the GPS coordinate information of the extracted road view image or road line information for parking and stopping marked on the road (S250), and then determines whether or not the location where a vehicle is parked is a no parking and stopping area (S260).

If it is determined in operation S260 that the parking location of a vehicle is a no parking and stopping area, information related to no parking and stopping area is transmitted to the user terminal 300 (S270).

Meanwhile, in the parking location guiding method for a vehicle according to an embodiment of the present invention, the user terminal 300 receives and displays the map information including the location information of a vehicle transmitted from the management server 200 (S300).

That is, a user can check the accurate location where a vehicle is parked through the map application 400 and a vehicle location marker 410 transmitted from the management server 200 to a user terminal 300, and can accurately check whether the parking location is the right side or the left side of the road.

Accordingly, it is possible to easily find the location of a vehicle by identifying the parking location using surrounding images and road view images of the parked vehicle and providing parking location information and the road view images through a user terminal The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for guiding a parking location of a vehicle, the system comprising:
    a photographing terminal acquiring a photographed image of surroundings of a vehicle comprising photographing direction information, Global Positioning System (GPS) coordinate information of a parking location of the vehicle, and unique identification information and transmitting the photographed image, the GPS coordinate information and the unique identification information to a management server when the vehicle is turned off;
    the management server performing user authentication based on the unique identification information when the photographed image, the GPS coordinate information and the unique identification information are received from the photographing terminal, and retrieving road view images based on the GPS coordinate information to extract a road view image having a similarity equal to or greater than a preset reference value to the photographed image when the user authentication is completed, and comprising location information of the vehicle based on the extracted road view image in map information to transmit the map information to a user terminal; and
    the user terminal receiving and displaying the map information comprising the location information of the vehicle transmitted from the management server.

2. The system of claim 1, wherein the photographing terminal comprises:
    a camera module comprising a plurality of cameras for photographing the surroundings of the vehicle;
    a GPS module for outputting GPS coordinate information corresponding to a current location of the vehicle;

a photographing terminal controller outputting an operation control signal to the camera module and the GPS module when the vehicle is turned off, adding the photographing direction information to the photographed image outputted from the camera module, and controlling such that the photographed image, the GPS coordinate information and the pre-stored unique identification information are transmitted to the management server; and a data communication unit transmitting the photographed image, the GPS coordinate information and the unique identification information to the management server.

3. The system of claim 2, wherein the photographing terminal further comprises a black box for photographing the surroundings of the vehicle, and the photographing terminal controller receives a photographed image and GPS coordinate information outputted from the black box and transmits the photographed image and the GPS coordinate information to the management server.

4. The system of claim 1, wherein the management server comprises:

a data communication unit receives the photographed image, the GPS coordinate information and the unique identification information from the photographing terminal and transmits the map information comprising the location information of the vehicle to the user terminal;

a location analyzing unit performing the user authentication by comparing the received unique identification information with user information stored, retrieving road view images based on the received GPS coordinate information from a road view database to extract a road view image having a similarity equal to or greater than a preset reference value to the photographed image, and comprising location information of the vehicle based on the extracted road view image in map information retrieved from a map database to transmit the map information to the user terminal;

a user database storing the unique identification information, the user information corresponding to the unique identification information, and information on the user terminal;

the map database storing the GPS coordinate information and the map information; and the road view database storing the GPS coordinate information and the road view images.

5. The system of claim 4, wherein the location analyzing unit compares the received photographed image with the road view image using an image analysis program, calculates a similarity value according to the comparison result, and extracts the road view image having a similarity value equal to or greater than a preset reference value for similarity determination.

6. The system of claim 5, wherein the location analyzing unit extracts parking direction information of the vehicle based on the location information corresponding to the photographed image on the extracted road view image and the photographing direction information comprised in the photographed image.

7. The system of claim 6, wherein the location analyzing unit additionally transmits at least one of a forward road view image of the parked direction and a backward road view image of the parked direction to the user terminal based on the extracted parking direction information.

8. The method of claim 7, wherein the location analyzing unit retrieves whether the parking location of the vehicle is a no-parking and stopping area or a frequent accident area based on the GPS coordinate information of the extracted road view image and the parking and stopping mark information displayed on a road, and transmits the retrieval result to the user terminal.

9. A method for guiding a parking location of a vehicle, the system comprising:

acquiring, by a photographing terminal, a photographed image of surroundings of a vehicle comprising photographing direction information, Global Positioning System (GPS) coordinate information of a parking location of the vehicle, and unique identification information and transmitting the photographed image, the GPS coordinate information and the unique identification information to a management server when the vehicle is turned off;

performing, by the management server, user authentication based on the unique identification information when the photographed image, the GPS coordinate information and the unique identification information are received from the photographing terminal, and retrieving road view images based on the GPS coordinate information to extract a road view image having a similarity equal to or greater than a preset reference value to the photographed image when the user authentication is completed, and comprising location information of the vehicle based on the extracted road view image in map information to transmit the map information to a user terminal; and receiving and displaying, by the user terminal, the map information comprising the location information of the vehicle transmitted from the management server.

* * * * *